UNITED STATES PATENT OFFICE.

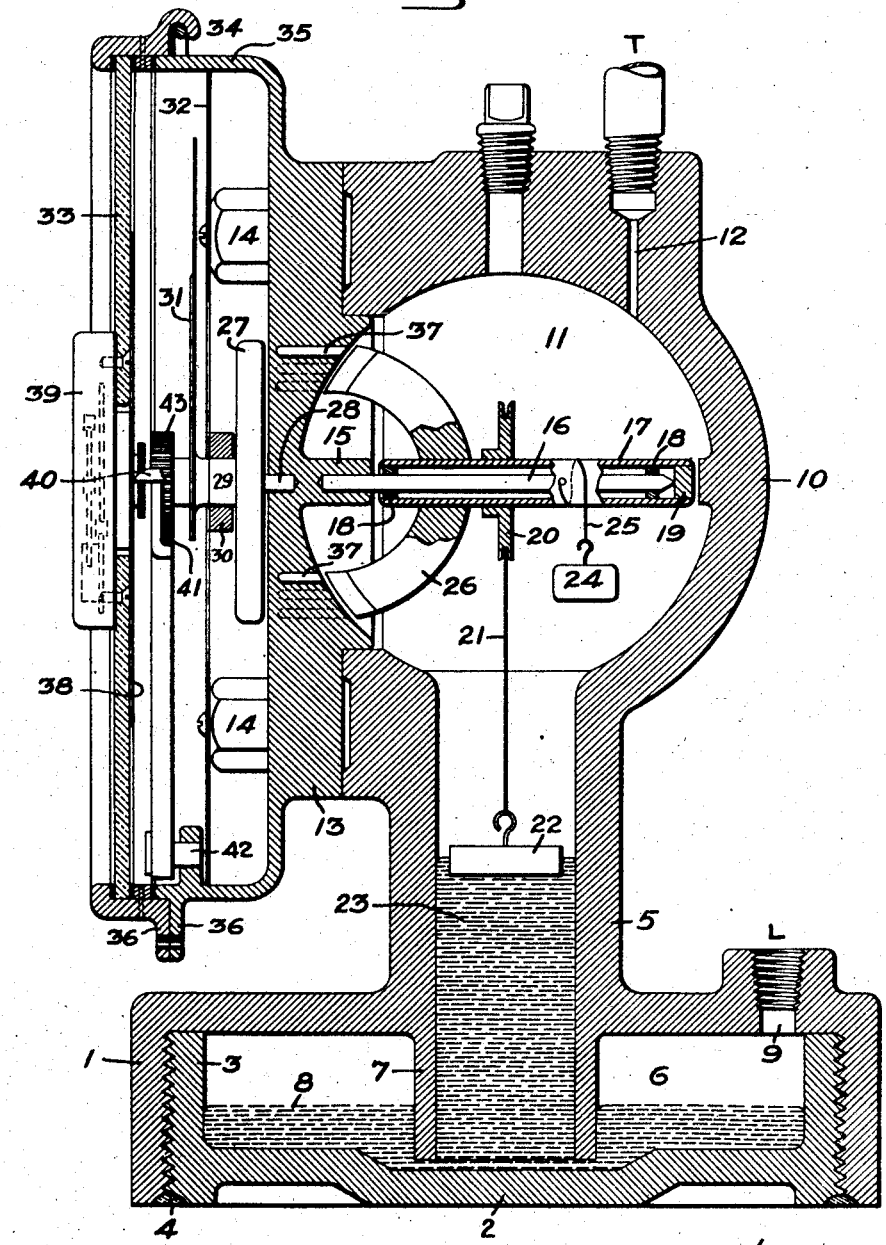

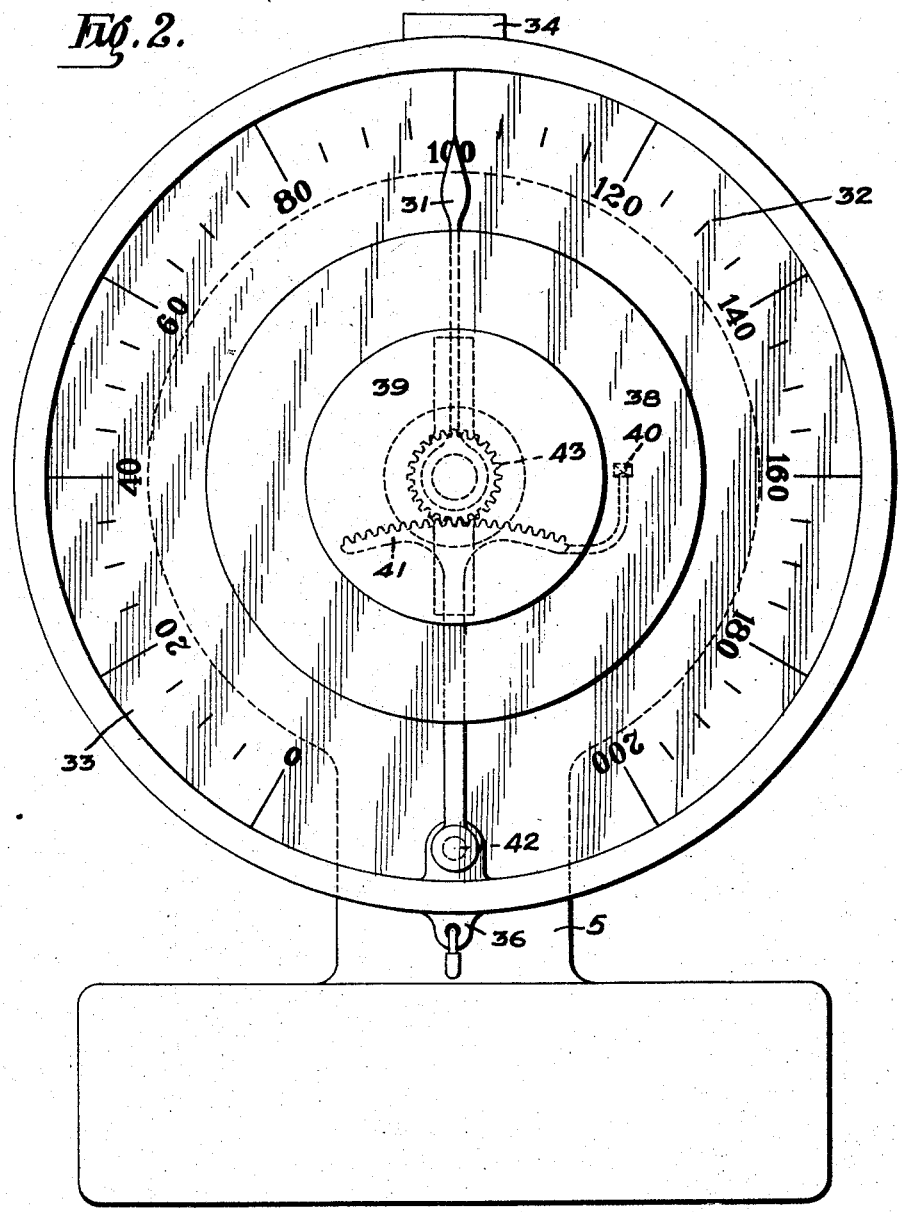

JAMES WILKINSON, OF BOSTON, MASSACHUSETTS, ASSIGNOR TO GENERAL ELECTRIC COMPANY, A CORPORATION OF NEW YORK.

FLUID-FLOW METER.

1,174,787.  Specification of Letters Patent.  Patented Mar. 7, 1916.

Application filed November 4, 1912. Serial No. 729,454.

*To all whom it may concern:*

Be it known that I, JAMES WILKINSON, a citizen of the United States, residing at Boston, in the county of Suffolk, State of Massachusetts, have invented certain new and useful Improvements in Fluid-Flow Meters, of which the following is a specification.

This invention relates to instruments for indicating visually, and also recording, the rate of flow of steam or other fluid through a conduit, measured preferably in pounds per hour. Such instruments usually comprise means for converting the velocity head of the fluid into a pressure head, and a pressure-responsive device or meter proper to measure and display visible indications of the changes in pressure due to varying flow of the fluid.

The present invention has to do more particularly with a novel arrangement of recording mechanism.

In the accompanying drawings, Figure 1 is a vertical section of my improved meter, and Fig. 2 is a front elevation of the same.

The base 1 is hollow, its bottom 2 being preferably made separate for convenience in construction. Said bottom has a flange 3 which screws into the base, and the joint is then sealed at 4, preferably by the application of an oxy-acetylene blow pipe flame. A tubular standard 5 rises centrally from the base, and its internal bore is continued down into the chamber 6 in said base by means of a depending tube 7, preferably integral with said base. The chamber 6 and lower part of the standard contain a mass of mercury 8 and the chamber is connected by an opening 9 with the region of higher pressure in the conduit. Surmounting the standard is a head 10 containing a preferably spherical chamber 11 communicating with the chamber 6 through the tubular standard 5 and the depending tube 7. The chamber 11 also communicates by a narrow passage 12 with the region of lower pressure in the conduit. The front of the chamber 11 is formed by a face plate 13 secured to the head 10 by the screws 14. A lug 15 projects centrally from said face plate into the chamber along a horizontal diameter thereof. Rigidly secured in said lug is a steel spindle 16 extending diametrically across said chamber: A sleeve 17 is rotatably mounted on this spindle, preferably by means of internal bushings 18. At the outer end of the sleeve is a block 19 of hard material, such as glass, affording a step bearing for the pointed end of the spindle. A drum 20 is secured to the sleeve with a cord 21 running therefrom to a float 22 resting on the column of mercury 23 in the tubular standard 5. A counterweight 24 is attached to a cord 25 wound on the sleeve in the opposite direction to the cord 21. The variations of velocity in the conduit cause the column of mercury in the standard 5 to rise and fall, said standard and the base 1 constituting in effect a U-tube manometer. The rise and fall of the float revolve the sleeve to and fro on the spindle, and these movements are rendered visible by the following instrumentalities. A U-shaped permanent magnet 26 is secured on the sleeve 17 with its poles in proximity to the face plate 13. Just in front of said face plate is an iron armature 27 carried by a short shaft mounted on a bearing 28 in the face plate and an outer bearing 29 in a bridge piece 30. An index 31 is secured to this shaft, and coöperates with a stationary annular dial 32 attached to the heads of the screws 14. This dial is visible through a glazed cover 33 hinged at 34 to a flange 35 on the face plate. Perforated lugs 36 on said cover and plate enable the cover to be locked by a padlock, if desired. The oscillations of the U-shaped magnet 26 cause similar oscillations of the armature 27 and the index 31.

To carry the magnetic flux through the thicker portion of the face plate, iron pins 37 may be embedded in said plate coinciding with the path of revolution of the magnet pole pieces, and terminating at or near the outer surface of the face plate.

In order to obtain a permanent record of the fluid flow from hour to hour, a chart 38 is arranged to be rotated by clockwork 39 just inside the glazed cover 33, to which said clockwork is secured. A pen 40 bears upon said chart and is carried by a segment gear 41 pivoted at 42 and meshing with a pinion 43 on the shaft of the armature 27.

The operation is obvious from the drawings taken in connection with the foregoing description but may be briefly recapitulated as follows: Variations in fluid flow cause changes in the level of the mercury in the standard 5, and the rise and fall of the float oscillates the magnet 26 whose movements are followed by the armature 27. The thrust on the sleeve due to magnetic attraction is sustained by the step bearing 19. The index 31 swings over the dial 32 and shows the attendant what the steam consumption is at any instant; while the pen 40, actuated by the pinion 43 and segment gear 41, makes a permanent record on the chart 38. It will be observed that the chart does not face the observer, but is concealed from view, so that the record is a secret one, accessible only to the official who carries the key to unlock the glazed cover 33.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:—

1. In an indicating and recording instrument, the combination of a casing, an annular dial therein, a glazed cover for the casing through which the dial is visible, clockwork secured to and carried by said cover, a chart revolved by said clockwork, said chart being of lesser diameter than the cover so that the dial may be visible around it, and recording means bearing on said chart.

2. In an indicating and recording instrument, the combination of a casing, an annular dial therein, a glazed cover for the casing through which the dial is visible, clockwork secured to said cover adjacent the central portion thereof and supported solely thereby, a chart revolved by said clockwork inside said cover and facing inward, said chart being of lesser diameter than the cover so that the dial may be visible around it, and a recording pen bearing upon said chart.

3. In an indicating and recording mechanism, the combination of a casing, a glazed cover therefor having a central opening, a clock-work mounted in said opening in the cover and supported solely thereby, an inwardly facing chart revolved by said clockwork, said chart being supported at the inner face of said cover, and a recording means operatively arranged in the casing for making a record on said chart.

4. In an indicating and recording mechanism, the combination of a casing, a glazed cover therefor having a central opening, a clock-work mounted in said opening in the cover and supported solely thereby, an inwardly facing chart revolved by said clockwork, said chart being supported at the inner face of said cover and being of lesser diameter than the glazed portion of the cover, a dial in the casing which is visible from the outside around said chart, and a recording means operatively arranged in the casing for making a record on said chart.

In witness whereof, I have hereunto set my hand this 31st day of October 1912.

JAMES WILKINSON.

Witnesses:
ELMER SMITH.
N. L. GANNON.